July 8, 1947.                M. R. HUTCHISON, JR                2,423,706
                        BLADE AND COVER BLIND SHUTTER
              Filed Oct. 12, 1945                 2 Sheets-Sheet 1
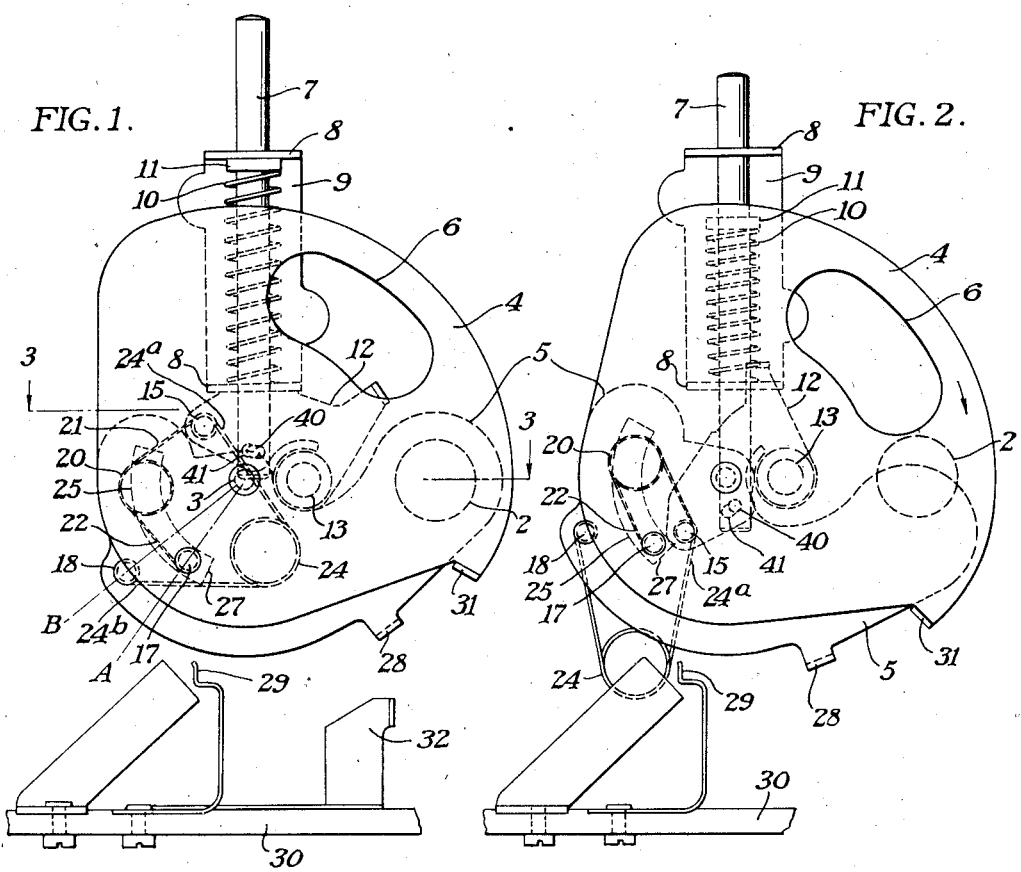
MILLER R. HUTCHISON, JR.
INVENTOR
BY
ATTORNEYS July 8, 1947.  M. R. HUTCHISON, JR  2,423,706
BLADE AND COVER BLIND SHUTTER
Filed Oct. 12, 1945  2 Sheets-Sheet 2

MILLER R. HUTCHISON, JR
INVENTOR

BY
ATTORNEYS

Patented July 8, 1947

2,423,706

UNITED STATES PATENT OFFICE 2,423,706

BLADE AND COVER BLIND SHUTTER

Miller R. Hutchison, Jr., Rochester, N. Y., assignor to Eastman Kodak Company, Rochester, N. Y., a corporation of New Jersey Application October 12, 1945, Serial No. 622,028

6 Claims. (Cl. 95—60)

This invention relates to photography and more particularly to simple types of photographic shutters, particularly adapted for inexpensive cameras. One object of my invention is to provide a shutter of the class described in which the shutter blade may be moved comparatively slowly and with certainty. Another object of my invention is to provide a shutter of the class described in which a starting impulse is applied to the shutter blade to insure starting movement of the shutter blade. A still further object of my invention is to provide a shutter which is inexpensive and which will produce the required comparatively long automatic exposure generally used with so-called single lenses which are usually meniscus or meniscus achromatic lenses having a small diaphragm opening.

In inexpensive shutters, the parts are ordinarily made from punch-pressed sheet metal parts which are ordinarily lacquered, or treated with a suitable rustproofing process, so that it is not always easy to reduce friction to a point where a required comparatively slow exposure, such as $\frac{1}{25}$ of a second, can be reliably obtained. It is ordinarily a simple matter to move a shutter blade slowly enough for such an exposure if a relatively weak spring is used, but such springs are not ordinarily reliable because they do not have sufficient power to overcome the friction of the shutter blade in starting. My invention is particularly directed to overcoming these difficulties without an appreciable addition to the number of parts used in the shutter.

Coming now to the drawings wherein like reference characters denote like parts throughout:

Fig. 1 is a rear elevation of a shutter, with certain parts removed for clearness, as it would appear looking from the inside of the camera outwardly; the parts being shown in a normal position of rest;

Fig. 2 is a view similar to Fig. 1 but with the parts shown as they appear just before an exposure is made;

Fig. 3 is an enlarged fragmentary detailed section with certain parts being shown in elevation;

Figure 4:
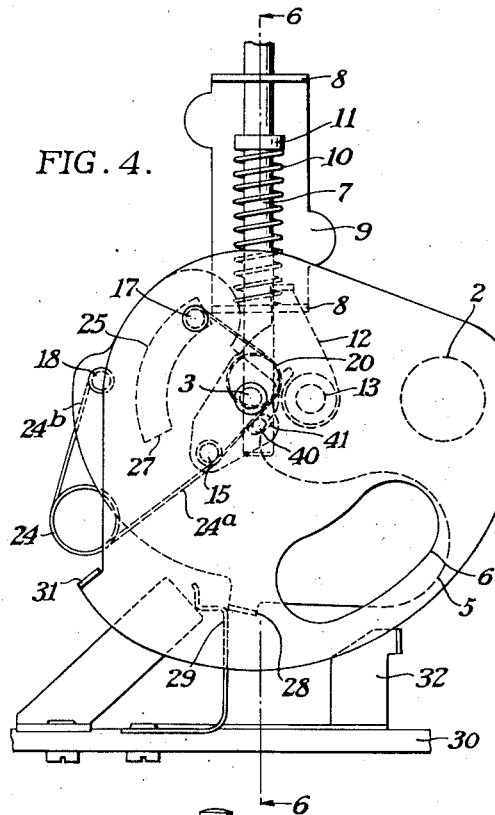
Fig. 4 is a view similar to Fig. 1 but with the parts as they appear after an exposure is completed.

My invention consists broadly in providing an inexpensive shutter of a so-called blade-and-cover-blind type and in so arranging the cover blind that it both releases the shutter blade spring and, in addition, it imparts a starting influence to the shutter blade. This shutter differs from the customary type of blade and shutter blind cover in that while the cover blind is moved, through movement of the trigger, it does not move with the trigger but includes a separate spring which is tensioned and released through movement of the trigger.

More specifically, as indicated in Fig. 3, my shutter may consist of a support 1 which is apertured at 2, this aperture constituting an exposure aperture. There is a stud 3 extending through to both sides of the support 1. This stud oscillatably supports a shutter blade 4 on one side and cover blade 5 on the opposite side. Thus, both these movable plates may be carried coaxially on the single stud 3. This not only facilitates assembly but provides a substantial arrangement for properly positioning the two plates.

The shutter blade 4 is here shown as consisting of a thin punch-pressed sheet metal part having an elongated slot or opening 6 adapted to cover and uncover the exposure aperture 2 in swinging upon the stud 3 to make an exposure. In its normal position of rest, shown in Fig. 1, the slot 6 is spaced from the exposure aperture 2 quite a material distance and it should be noticed that the exposure aperture 2 is also covered by the cover blind 5. The cover blind 5 is also pivoted on the stud 3 and may swing to and from a position covering the exposure aperture 2.

A trigger 7 is provided, this trigger in the present instance being slidably mounted in the ears 8 of a bracket 9 which may be attached to the support 1 in any suitable manner. A spring 10, pressing against one ear 8 and a shoulder or protuberance 11 on the trigger, tends to hold the trigger outwardly in the position of rest shown in Fig. 1. The trigger consists of two main portions, the rod 7 and a small segment 12, which is mounted to swing upon the stud 13 carried by the support 1. This swinging movement carries a pin 15 through a path which intersects the radial lines A—B, shown in Fig. 1, line A being a line drawn between the stud 3 which supports the cover blind 5 and a stud 17 on the shutter blade. Line B is drawn between a pin 18 on the cover blind and the stud 3. The stud 17 and pin 18 are angularly offset as indicated in Fig. 1 so that the cover blind 5 will move before the shutter blade 4 as will be more fully described hereinafter.

The pin 15, carried by the trigger section 12, carries one end of two springs. The spring 20 is the shutter blade spring and includes one end 21 connected to the pin 15, and the other end 22 connected to the stud 17. The spring 24 has one end 24a connected to the pin 15 and the other end 24b connected to the pin 18. In the preferred form of my invention, the spring 24, which is the cover blind spring, is more powerful than the spring 20 which is the shutter blade spring, the power of the two springs being easily controlled by selecting the proper diameter of wire.

The two trigger parts 7 and 12 are operably connected by a pin 40 carried by the trigger 7 and a slot 41 in the trigger segment 12 so that these two parts in the embodiment shown in the drawings always move together as a unit.

When the trigger 7 is depressed and the pin 15 swings through its arcuate path, it will, of course, tension both the spring 20 and the spring 24 simultaneously. However, because of the offset angle between the lines A and B, the movement of the trigger will release the spring 24, which is the cover blind spring, when the stud 15 passes the dead center indicated by the line A of Fig. 1. Thus, the cover blind 5 will start to move before the shutter blade 4. The starting movement of the cover blind is shown in Fig. 2 in which position the pin 15 is just reaching a position in which the spring 20 may be released to drive the shutter blade 4 through its path of movement to make an exposure.

Since the spring 24 is more powerful than spring 20, I provide a means for initiating movement of the shutter blade 4 operated by the cover blind. In the present instance, this means is a pin-and-slot connection which is formed by the pin 17 extending from the shutter blade through a slot 25 in the cover blind, this slot also having a counterpart at 26 in the supporting plate 1, enabling this lost-motion connection between the cover blind and shutter blade to perform its function.

Referring to Fig. 2, it will be noticed that the pin 17 has struck the end 27 of the slot 25, thus engaging and moving the shutter blade 4. From the position shown in Fig. 2, the cover blind and shutter blade will move together until a lug 28 on the cover blind reaches the spring stop 29 carried by a suitable camera part 30. When this occurs, the cover blind 5 will cease moving and the shutter blade 4 will continue to move under the power of its weaker spring 20 until the pin 17 on the shutter blade also reaches the end of slot 25 in the cover blind 5.

From the above description it will be noticed that when the trigger 7 is depressed the proper distance, springs 20 and 24 will be tensioned and spring 24 will be released. The releasing of this spring causes the cover blind to move until the pin 17 strikes the end 27 of the slot 25, giving the shutter blade 4 a push and moving with the shutter blade a short distance to insure proper starting of the shutter blade. However, the force of the spring 24 is largely consumed in starting the shutter blade 4, so that it slows up and moves with the shutter blade a short distance, or until the cover blind reaches its stop, at which time the shutter blade 4 proceeds under its own spring 20 to complete its movement. Thus, I am able to obtain comparatively slow movement of the shutter blade 4 without any liability of uncertainty in starting the movement of this blade through its weak spring.

When the shutter trigger 7 is released, the spring 10 will restore the trigger to its initial position of rest, shown in Fig. 1, and since the spring 10 has considerably more power than the combined strengths of the springs 20 and 24, it will again set and release these springs so that they may both return to their initial position. However, during the returning movement, the cover blind 5 moves in advance of the shutter blade 4 and covers the exposure aperture 2 before the exposure opening 6 of the shutter blade begins to uncover and then cover the exposure opening 2.

Figure 5:
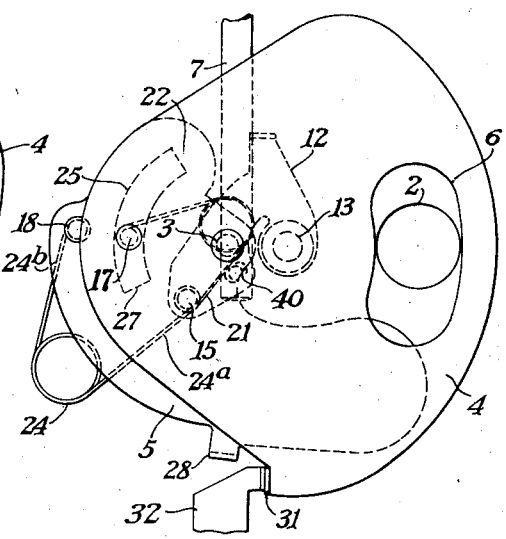
Fig. 5 is a view similar to Fig. 1 but with the shutter open for a prolonged exposure.
Figure 6:
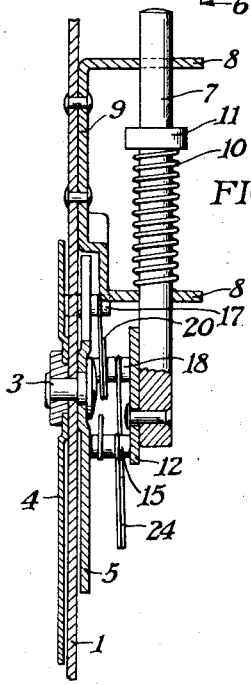
Fig. 6 is a detail section taken on line 6—6 of Fig. 4.

As indicated in Fig. 1, a "time" stop 32 is provided on wall 30 which can be moved from the inoperative position Fig. 1 to an operative position in Fig. 5 in which position it may engage shutter blade lug 31. When so positioned it will stop the shutter blade 4 with the opening 6 over the exposure aperture 2. Releasing the shutter will cause the shutter parts to move in a reverse direction and to their Fig. 1 position of rest terminating the prolonged exposure, or if desired the "time" stop may be moved by a suitable handle, not shown, in which case movement of the blade in the same direction would take place until the exposure opening 2 is closed. Such time stops are known and this stop forms no part of the present invention.

Figure 7:
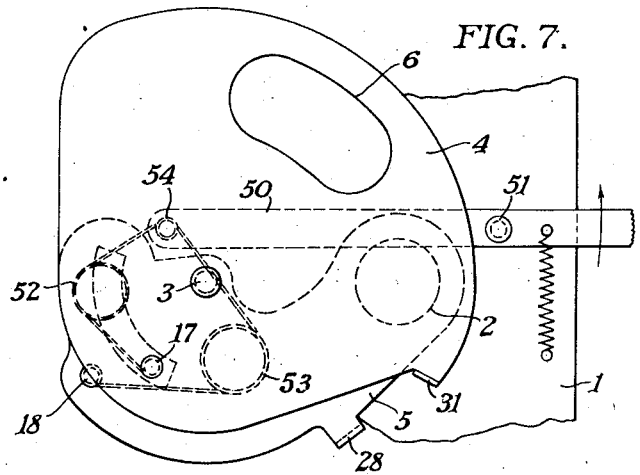
Fig. 7 is a rear elevation of a shutter constructed in accordance with a second embodiment of my invention.

While I have described a preferred embodiment of my invention, it is obvious that various changes can be made therein without departing from my invention. I have shown, for instance, a slidably-mounted trigger since such triggers appear to be in particular favor at this time. It is very obvious that a further simplification of the shutter could occur by omitting entirely the sliding trigger 7 and providing a pivoted one as in Fig. 7. As shown herein, the shutter blade 4 may be the same as before as also is the cover blind 5, but the trigger 50 is pivoted at 51 and is unlike and simpler than trigger 7. Springs 52 and 53 attached to the shutter blade 4 and cover blind 5 are also attached to a stud 54 carried directly by the trigger 50.

Both embodiments of my invention provide a blade and cover blind type of shutter in which the cover blind is different from the usual cover blind in being operated, not directly by the trigger but by being indirectly operated through a spring. In addition, the cover blind imparts a starting impulse to the shutter blade, permitting a light spring to continue the movement of the shutter.

I claim:

1. A camera shutter comprising an apertured support, a shutter blade pivotally mounted thereon for movement to uncover and cover said aperture to make an exposure, a cover blind pivotally mounted on the support for movement to uncover and cover said aperture, a trigger movably mounted on the support, a shutter blade spring connecting the shutter blade and trigger, a cover blind spring connecting the cover blind and trigger, said trigger setting both springs by moving said springs as the trigger is moved, the connections between the cover blade spring and the cover blade, and the cover blind spring and cover blind being angularly offset with respect to the pivotal mounts of the shutter blade and cover blind whereby movement of the trigger may be set both springs and release only the cover blind spring and means carried by the cover blind for releasing the shutter blade spring whereby the shutter blade may swing upon its pivot to make an exposure.

2. The camera shutter defined in claim 1 characterized by both springs being of hairpin shape.

3. The camera shutter defined in claim 1 characterized by the means for releasing the shutter blade spring carried by the shutter blade including a means for contacting with and moving the shutter blade to start movement thereof.

4. The camera shutter defined in claim 1 characterized by the means for releasing the shutter blade spring carried by the shutter blade including a means for limiting the movement of the shutter blade relative to the cover blind.

5. The camera shutter defined in claim 1 characterized by the shutter blade and cover blind being coaxially mounted and by the means for releasing the shutter blade spring consisting of a pin-and-slot connection between the coaxially-mounted shutter blade and cover blind.

6. A camera shutter, comprising an apertured support, a shutter blade pivoted to the support for movement to uncover and cover said aperture to make an exposure, a cover blind pivotally mounted on the support for movement to uncover and cover the exposure aperture, a shutter trigger movably mounted on the support, a spring connecting the trigger and shutter blade, a second spring connecting the trigger and cover blind, said trigger simultaneously setting said springs and releasing the cover blind spring after setting, a pin-and-slot connection between the shutter blade and cover blind through which said set and released cover blind may initiate movement of the shutter blade and release the spring thereof whereby said shutter blade, traveling under the impulse of its own spring, may make an exposure.

MILLER R. HUTCHISON, JR.

Certificate of Correction

Patent No. 2,423,706.                                                                                           July 8, 1947.

MILLER R. HUTCHISON, Jr.

It is hereby certified that error appears in the printed specification of the above numbered patent requiring correction as follows: Column 4, line 74, claim 1, for the words "may be set" read *may set*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.*